(12) United States Patent
Teillet et al.

(10) Patent No.: US 11,523,558 B2
(45) Date of Patent: Dec. 13, 2022

(54) GEARBOX AND WHEELED VEHICLE PROVIDED WITH SUCH A GEARBOX

(71) Applicant: FRANCE REDUCTEURS, Les Herbiers (FR)

(72) Inventors: Emmanuel Teillet, Les Chatelliers Chateaumur (FR); Damien Morand, Chavagnes en Paillers (FR)

(73) Assignee: FRANCE REDUCTEURS, Les Herbiers (FR)

( * ) Notice: Subject to any disclaimer, the term of this patent is extended or adjusted under 35 U.S.C. 154(b) by 248 days.

(21) Appl. No.: 16/755,500

(22) PCT Filed: Oct. 2, 2018

(86) PCT No.: PCT/FR2018/052420
§ 371 (c)(1),
(2) Date: Apr. 10, 2020

(87) PCT Pub. No.: WO2019/077220
PCT Pub. Date: Apr. 25, 2019

(65) Prior Publication Data
US 2021/0219490 A1 Jul. 22, 2021

(30) Foreign Application Priority Data

Oct. 16, 2017 (FR) ...................................... 1759650

(51) Int. Cl.
*A01D 34/68* (2006.01)
*A01D 34/69* (2006.01)
(Continued)

(52) U.S. Cl.
CPC ......... *A01D 34/6812* (2013.01); *A01D 34/69* (2013.01); *F16C 1/10* (2013.01);
(Continued)

(58) Field of Classification Search
CPC ....... A01D 34/6812; A01D 34/69; F16C 1/10; F16D 23/12; F16D 11/10; F16D 13/52;
(Continued)

(56) References Cited

U.S. PATENT DOCUMENTS

| 4,945,780 A * | 8/1990 | Bosma .................... F16H 63/30 |
| | | 104/93 |
| 6,095,294 A * | 8/2000 | McGourthy, Sr. ...... F16D 49/00 |
| | | 477/204 |
| 2006/0060017 A1 * | 3/2006 | Ruebusch ............... F16D 11/10 |
| | | 74/340 |

FOREIGN PATENT DOCUMENTS

| CN | 2 499 262 | 7/2002 |
| EP | 0 782 820 | 7/1997 |

OTHER PUBLICATIONS

International Search Report dated Dec. 18, 2018.
Search Report dated Jun. 22, 2018.

* cited by examiner

*Primary Examiner* — Colby M Hansen
(74) *Attorney, Agent, or Firm* — Ipsilon USA, LLP

(57) ABSTRACT

The invention relates to a gearbox (1) comprising: a gearbox body (1A) defining an enclosure (1B), an input shaft (2), an output shaft (3) and a mechanism (4) for transmitting the movement of the input shaft (2) to the output shaft (3), said mechanism (4) for transmitting movement comprising at least one clutch (5) and a clutch (5) control device, the clutch (5) comprising a driving element (6) and a driven element (7) mounted rotatably secured to the output shaft (3) and having its axial movement limited in at least one direction along the output shaft (3), and the clutch (5) control device comprising a member for controlling the movement of the driving element (6) and the driven element (7) towards one another to allow the clutch (5) to pass from the declutched
(Continued)

position to the clutched position. The control member is formed by the gearbox body (1A) mounted to slide along the output shaft (3).

13 Claims, 7 Drawing Sheets

(51) Int. Cl.
*F16C 1/10* (2006.01)
*F16D 23/12* (2006.01)
*F16H 1/16* (2006.01)
*F16H 37/06* (2006.01)
*F16H 57/03* (2012.01)
*F16H 57/039* (2012.01)
*F16D 11/10* (2006.01)
*F16D 13/52* (2006.01)
*F16D 121/14* (2012.01)
*F16D 125/60* (2012.01)
*F16D 127/02* (2012.01)
*F16H 57/02* (2012.01)

(52) U.S. Cl.
CPC ............... *F16D 23/12* (2013.01); *F16H 1/16* (2013.01); *F16H 37/065* (2013.01); *F16H 57/039* (2013.01); *F16D 11/10* (2013.01); *F16D 13/52* (2013.01); *F16D 2121/14* (2013.01); *F16D 2125/60* (2013.01); *F16D 2127/02* (2013.01); *F16D 2300/14* (2013.01); *F16H 2057/02052* (2013.01); *F16H 2057/02056* (2013.01); *F16H 2702/00* (2013.01)

(58) Field of Classification Search
CPC ............. F16D 2121/41; F16D 2125/60; F16D 2127/02; F16D 2300/14; F16H 1/16; F16H 37/065; F16H 57/039; F16H 2057/02052; F16H 2057/02056; F16H 2702/00
See application file for complete search history.

FIG 2 a
FIG 2 b
FIG 2 c
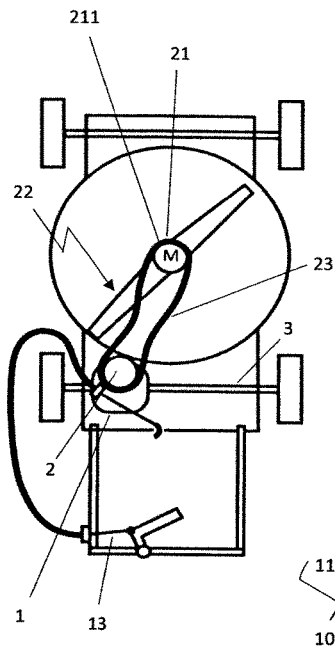
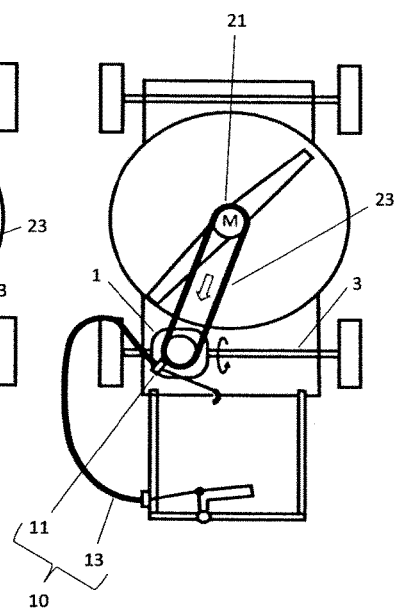
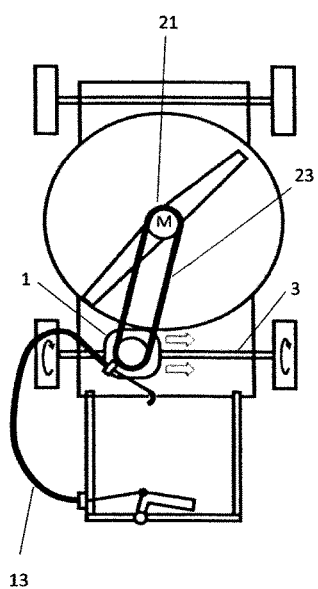
FIG 3
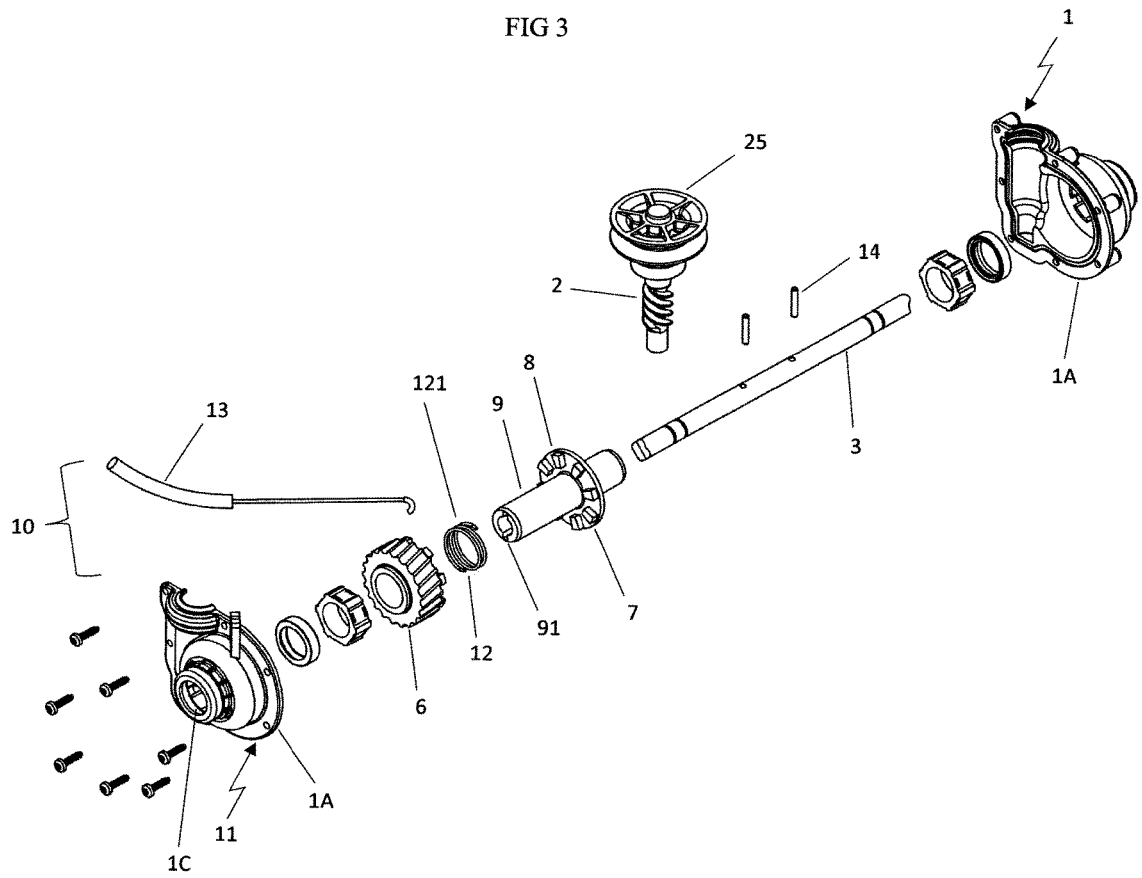

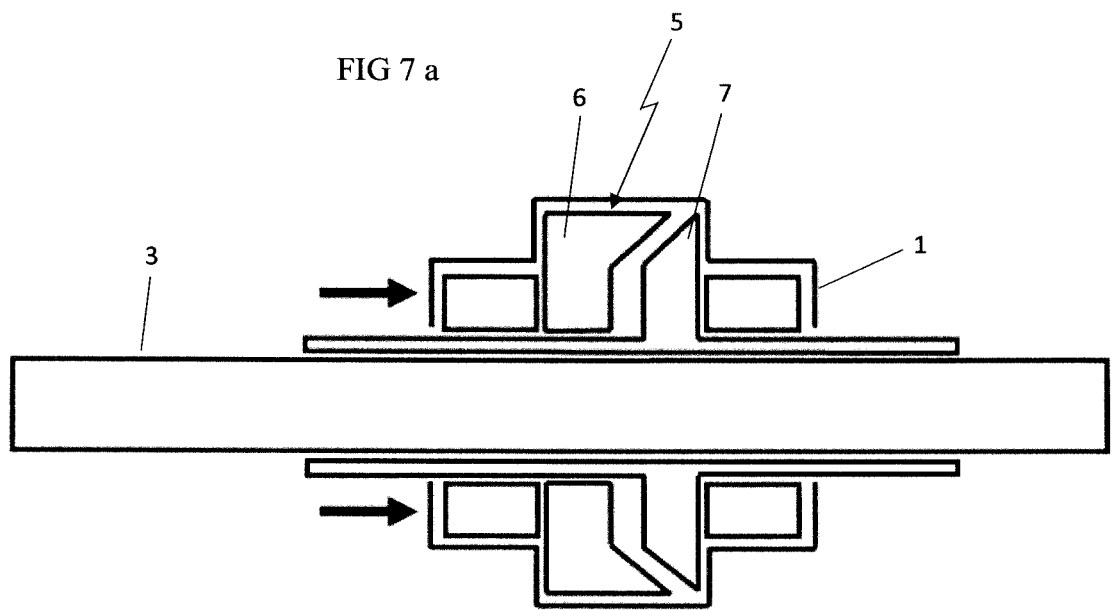
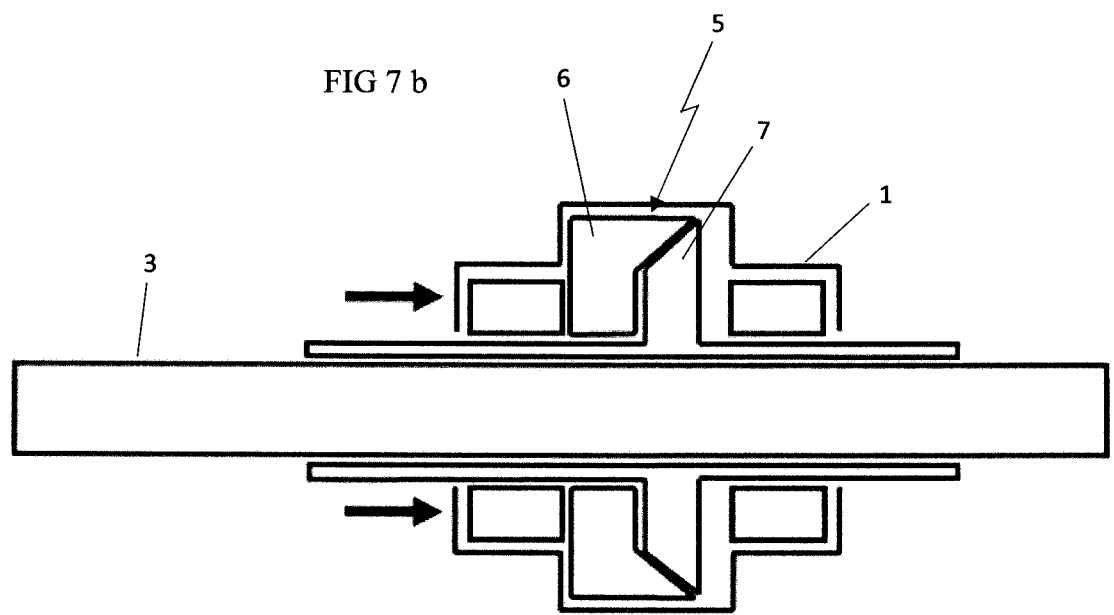

GEARBOX AND WHEELED VEHICLE PROVIDED WITH SUCH A GEARBOX

RELATED APPLICATION

This application is a National Phase of PCT/FR2018/052420 filed on Oct. 2, 2018, which in turn claims the benefit of priority from French Patent Application No. 17 59650 filed on Oct. 16, 2017, the entirety of which are incorporated by reference.

FIELD OF THE INVENTION

The invention relates to a transmission housing and to a wheeled machine equipped with such a housing.

It relates more particularly to a transmission housing comprising a housing body delimiting an enclosure, an input shaft, an output shaft, a mechanism for transmitting the movement of the input shaft to the output shaft, this transmission mechanism comprising at least one clutch, and a device for controlling the clutch, the input shaft, the output shaft and the mechanism for transmitting the movement of the input shaft to the output shaft being housed at least partially within the enclosure of the housing body, the clutch comprising a driving element and a driven element which is mounted so as to be locked in rotation with the output shaft and limited in axial movement in at least one direction along the output shaft, the device for controlling the clutch comprising a member for controlling the movement of the driving element and the driven element toward one another to allow the clutch to pass from the disengaged position to the engaged position.

PRIOR ART

A transmission housing of the aforementioned type is known. Generally, the driven element is moved toward the driving element with the aid of a control member housed within the housing. This control member is generally formed by a fork which is controlled in angular movement with the aid of a lever pivoting on the housing.

AIMS AND SUMMARY

One aim of the invention is to propose a transmission housing of simplified design.

Another aim of the invention is to propose a transmission housing whose design makes it possible to dispense with a clutch control member arranged within the housing.

To this end, one subject of the invention is a transmission housing comprising:
  a housing body delimiting an enclosure,
  an input shaft,
  an output shaft,
  a mechanism for transmitting the movement of the input shaft to the output shaft, this movement transmission mechanism comprising at least one clutch, and
  a device for controlling the clutch,
the input shaft, the output shaft and the mechanism for transmitting the movement of the input shaft to the output shaft being housed at least partially within the enclosure of the housing body, the clutch comprising a driving element and a driven element which is mounted so as to be locked in rotation with the output shaft and limited in axial movement in at least one direction along the output shaft, the device for controlling the clutch comprising a member for controlling the movement of the driving element and the driven element toward one another to allow the clutch to pass from the disengaged position to the engaged position, characterized in that the member for controlling the movement of the driving element and the driven element toward one another to allow the clutch to pass from the disengaged position to the engaged position is formed by the housing body mounted so as to be able to slide along the output shaft.

The use of the housing body as a clutch member makes it possible to dispense with a clutch control member arranged within the housing and generally composed at least of a lever, a fork and a seal between the lever and housing. This results in a reduction in the number of components and therefore in a simplification of the transmission housing.

According to one embodiment of the invention, the housing body is configured, during its sliding movement along the output shaft in a direction corresponding to the passage of the clutch from the disengaged position to the engaged position, to move the driving element in the direction of a movement toward the driven element.

According to one embodiment of the invention, the clutch comprises means for returning the driving element and the driven element in the direction of a movement away from one another, and the housing body is configured, during its sliding movement along the output shaft in a direction corresponding to the passage of the clutch from the disengaged position to the engaged position, to move the driving element in the direction of a movement toward the driven element, against the return means.

According to one embodiment of the invention, the device for controlling the clutch comprises a member for operating the member for controlling the movement of the driving element and the driven element toward one another, which operating member can be coupled to the housing body, and the housing body forming the member for controlling the movement of the driving element and the driven element toward one another is able to slide along the output shaft in a direction corresponding to the passage of the clutch from the disengaged position to the engaged position under the action of a pull or of a push exerted on said operating member, in the state in which the operating member is coupled to the housing body.

According to one embodiment of the invention, the driven element of the clutch comprises an active clutch part and a sleeve which bears the active clutch part, the active clutch part being in bearing contact with the driving element of the clutch in the engaged position of the clutch, the sleeve being coaxial to the output shaft and locked in rotation with the output shaft, and the driving element being mounted so as to be able to slide along the sleeve.

According to one embodiment of the invention, the sleeve and the active clutch part are made in one piece.

According to one embodiment of the invention, the sleeve is internally grooved longitudinally and is mounted so as to be locked in rotation with the output shaft by way of at least one connection member preferably mounted in a removable manner on the output shaft, this connection member projecting radially from said output shaft, each radial part of said connection member outside the output shaft being fitted slidingly in an inner longitudinal groove of the sleeve.

According to one embodiment of the invention, the sleeve is provided with an inner circumferential shoulder which can be positioned in bearing contact against each radial part of said connection member outside the output shaft in the state in which the sleeve is mounted on the output shaft, each radial part of said connection member outside the output shaft forming an axial stop for limiting the movement of the sleeve along said output shaft in the direction of a movement of the active clutch part of the sleeve away from the driving element.

According to one embodiment of the invention, the sleeve projects partially from the housing body, in the state in which the sleeve is mounted on the output shaft.

According to one embodiment of the invention, the driving element of the clutch is a rotary element able to be rotated by the input shaft, this driving element of the clutch being mounted to rotate freely with respect to the output shaft in the disengaged position of the clutch.

According to one embodiment of the invention, the clutch is a nonprogressive clutch, preferably a dog clutch, or a progressive clutch, preferably a cone clutch or multidisk clutch.

Another subject of the invention is a wheeled machine comprising a motor, a transmission housing comprising a housing body delimiting an enclosure and, housed at least partially within the housing enclosure, an input shaft, an output shaft for driving the wheels of the machine, and a mechanism for transmitting the movement of the input shaft to the output shaft, the movement transmission mechanism comprising at least one clutch, the clutch comprising a movable driving element and a driven element which is mounted so as to be locked in rotation with the output shaft and limited in axial movement in at least one direction along the output shaft, said housing additionally comprising a device for controlling the clutch, the device for controlling the clutch comprising a member for controlling the movement of the driving element and the driven element toward one another to allow the clutch to pass from the disengaged position to the engaged position, said wheeled machine additionally comprising endless transmission means between the motor and the input shaft of the transmission housing, characterized in that the housing is of the aforementioned type.

According or one embodiment of the invention, the endless transmission means comprise an endless transmission with a belt between a drive pulley mounted on the motor and a driven pulley borne by the input shaft of the transmission housing, and the housing body is mounted to oscillate about the output shaft in the direction of a tension, or respectively of a relaxation, of the belt of the transmission.

BRIEF DESCRIPTION OF THE FIGURES

The invention will be clearly understood on reading the following description of exemplary embodiments with reference to the appended drawings, in which:

FIG. 2 represents, in the form of three schematic parallel plan views of a machine, the passage from the disengaged position to the engaged position.

FIG. 3 represents a view in an exploded position of the constituent elements of a transmission housing according to the invention.

FIGS. 7a and 7b represent, in the form of schematic views, a transmission housing equipped with a cone clutch and the passage of said clutch from the disengaged position (FIG. 7a) to the engaged position (FIG. 7b).

DETAILED DESCRIPTION

As mentioned above, the invention relates to a transmission housing 1 intended to be installed in a wheeled machine 20 to allow the wheels of the machine to be rotated by the motor 21 equipping said machine.

Figure 1:
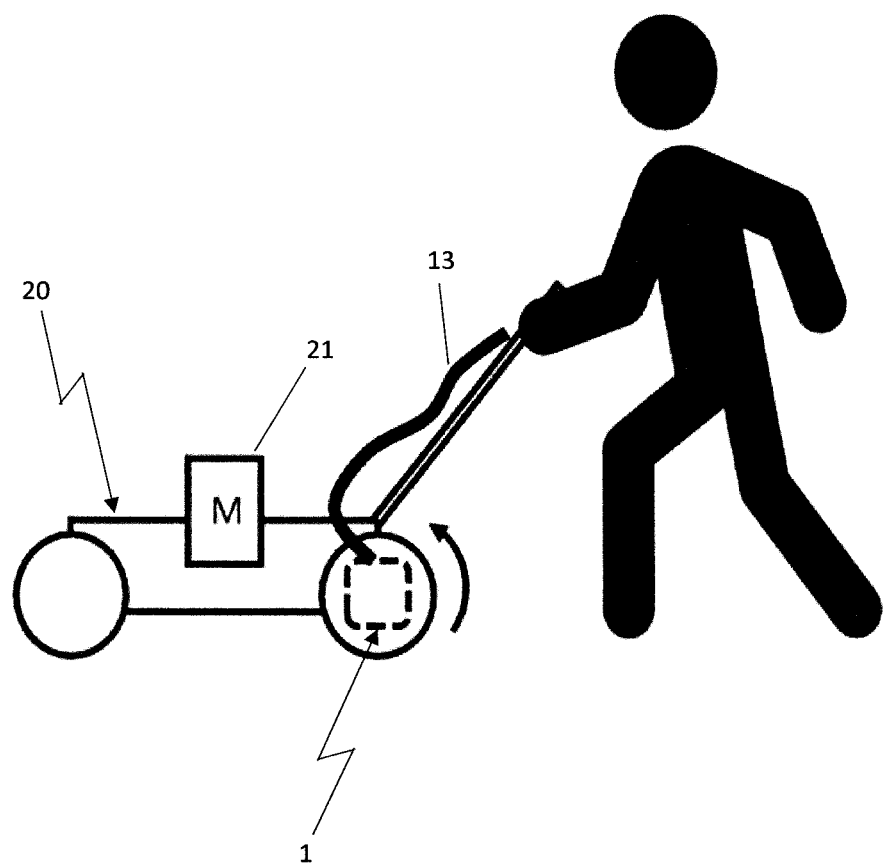
FIG. 1 represents a schematic view of a machine equipped with a transmission housing according to the invention.
Figure 4:
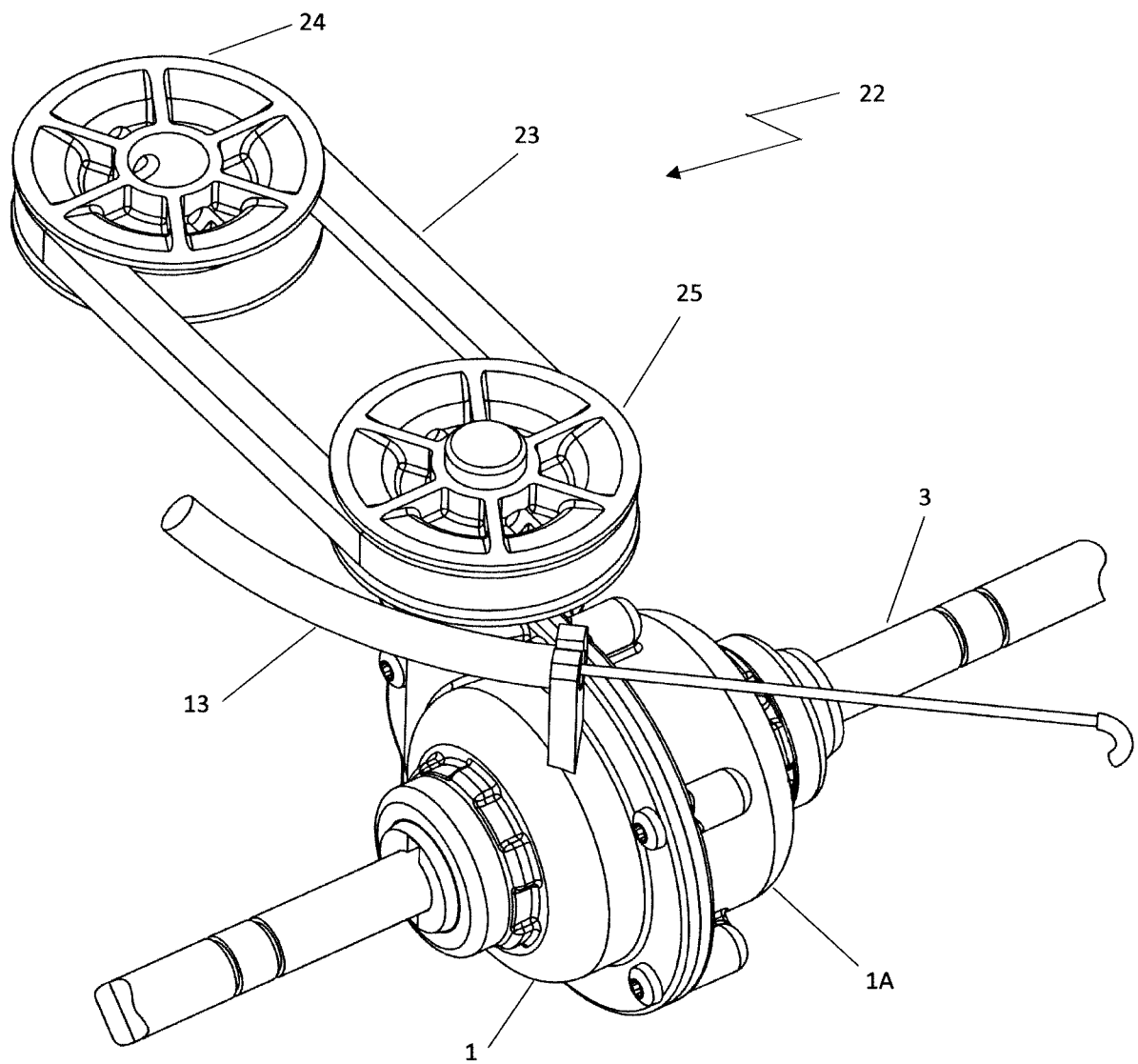
FIG. 4 represents a partial perspective view of a transmission housing according to the invention and of the endless transmission between the motor of the machine and the output shaft of said housing for driving the wheels of the machine.

The transmission housing 1 is therefore generally arranged on the shaft for rotating the wheels of the machine, as represented in FIG. 1, this shaft being termed hereinbelow as output shaft 3 of the transmission housing 1.

The wheeled machine 20 is in this case a lawnmower, but the invention can apply to other types of wheeled machines, in particular ones with an operator walking behind the machine 20.

The transmission housing 1 comprises a housing body 1A delimiting an enclosure 1B. In the example represented, this housing body 1A is formed by two shells assembled to one another. The assembly region at which the shells are assembled to one another by adhesive bonding and/or screwing or the like is termed jointing plane.

This transmission housing 1 further comprises an input shaft 2 housed partially within the enclosure 1B of the housing body 1A. For this purpose, an opening is formed in the body 1A of the transmission housing 1.

The transmission housing 1 further comprises, as mentioned above, an output shaft 3, likewise housed partially within the transmission housing body 1A. This output shaft 3 can project from the housing body 1A through one or two openings formed in the housing body 1A. In the example represented, the output shaft 3 passes through the housing body 1A and projects from the housing body 1A through two openings represented by 1C in the figures.

The transmission housing 1 further comprises a mechanism 4 for transmitting the movement of the input shaft 2, which is a rotary shaft, to the output shaft 3. The input shaft 2 is for its part rotated by way of endless transmission means 22. These endless transmission means 22 comprise an endless transmission with a belt 23 which is arranged between a drive pulley 24 mounted on the motor 21, in particular on the motor shaft 211 of said motor 21, and a pulley 25 borne by the input shaft 2 of the transmission housing 1.

The transmission of rotational movement from the input shaft 2 to the output shaft 3 is achieved with the aid of a movement transmission mechanism 4 which is housed within the enclosure 1B of the transmission housing 1 and which comprises at least one clutch 5.

Finally, the transmission housing 1 comprises a device 10 for controlling the clutch 5 to allow the clutch 5 to pass from the disengaged position to the engaged position.

The clutch 5 comprises a driving element 6 and a driven element 7. The driven element 7 is mounted so as to be locked in rotation with the output shaft 3. This driven element 7 is limited in movement in at least one direction, namely in the direction of a movement away from the driving element 6 along the output shaft 3.

The clutch control device 10 comprises for its part a member 11 for controlling the movement of the driving element 6 and the driven element 7 toward one another to allow the clutch 5 to pass from the disengaged position to the engaged position.

In a manner which is characteristic of the invention, this member 11 for controlling the movement of the driving element 6 and the driven element 7 toward one another to allow the clutch 5 to pass from the disengaged position to the engaged position is formed by the housing body 1A mounted so as to be able to slide along the output shaft 3.

In the examples represented, the clutch 5 comprises means 12 for returning the driving element 6 and the driven element 7 in the direction of a movement of one away from the other, and the housing body 1A is configured, during its sliding movement along the output shaft 3 in a direction corresponding to the passage of the clutch 5 from the disengaged position to the engaged position, to move the driving element 6 in the direction of a movement toward the driven element 7 against the return means 12. These return means 12 are formed by a helical spring 121 which can be arranged between the driving element 6 and the driven element 7 or between the driven element 7 and the body 1A of the housing.

To allow such a sliding movement of the housing body 1A along the output shaft 3, the device 10 for controlling the clutch 5 comprises a member 13 for operating the member 11 for controlling the movement of the driving element 6 and the driven element 7 toward one another, which operating member can be coupled to the housing body 1A, and the housing body 1A forming the member 11 for controlling the movement of the driving element 6 and the driven element 7 toward one another is able to slide along the output shaft 3 in a direction corresponding to the passage of the clutch 5 from the disengaged position to the engaged position under the action of a pull or of a push exerted on said operating member 13, in the state in which the operating member 13 is coupled to the housing body 1A.

This operating member 13 can assume a large number of forms. In the example represented, this operating member 13 is an assembly formed by a cable and by a sheath. A lug arranged on the housing body 1A couples this assembly to the housing body 1A.

In the example represented, the sheath is coupled, at one end, to the housing body 1A and, at its other end, to the chassis of the machine 20. The cable for its part is fastened, at one end, to the chassis of the machine 20 and, at its other end, to the handlebars of the machine via a pivoting lever which can be actuated by the operator of the machine. Actuating this lever generates a pull on the cable and therefore a deformation of the sheath, which causes at least a sliding movement of the housing body 1A along the output shaft, as illustrated in the last two diagrams of FIG. 2.

Of course, other embodiments of this operating member can be envisioned without departing from the scope of the invention.

Thus, the cable/sheath assembly could have been replaced by an operating rod, by a cable fastened directly to the housing body 1A, or the like.

In the example represented in FIG. 2, the housing body 1A is additionally mounted to oscillate about the output shaft 3 in the direction of a tension or of a relaxation of the transmission belt 23. The operating member 13 can therefore be used, on the one hand, so as, in a first instance, to cause the tension of the belt 23 of the endless transmission between the motor 21 and the input shaft 2 by oscillation of the housing body 1A about the output shaft 3, and then, in a second instance, the sliding movement of the housing body 1A along the output shaft 3. This oscillating movement can be suppressed when the operating member 13 controls only a sliding movement of the housing body 1A along the output shaft 3, the belt 23 being either tensioned permanently or tensioned by some other means.

The clutch 5 of the movement transmission mechanism 4 can assume a large number of forms. As mentioned above, the driving element of this clutch 5 is a rotary element able to be rotated by the input shaft 2. This driving element 6 of the clutch 5 is mounted so as to be free to rotate with respect to the output shaft 3 in the disengaged position of the clutch 5. This driving element 6 can be made in one piece or in the form of a monobloc assembly with the input shaft 2. This driving element 6 can also be formed separately from the input shaft 2.

The clutch 5 can be a nonprogressive clutch 5, such as a dog clutch, or a progressive clutch, such as a cone clutch or multidisk clutch.

The driven element 7 of the clutch 5 is mounted so as to be locked in rotation with the output shaft 3 and is limited in axial movement along the output shaft 3, in the direction of a movement away from the driving element 6.

The housing body 1A is moved by the operating member 13 and, during its movement, drives the driving element 6 in the direction of a movement toward the driven element 7.

Figure 5:
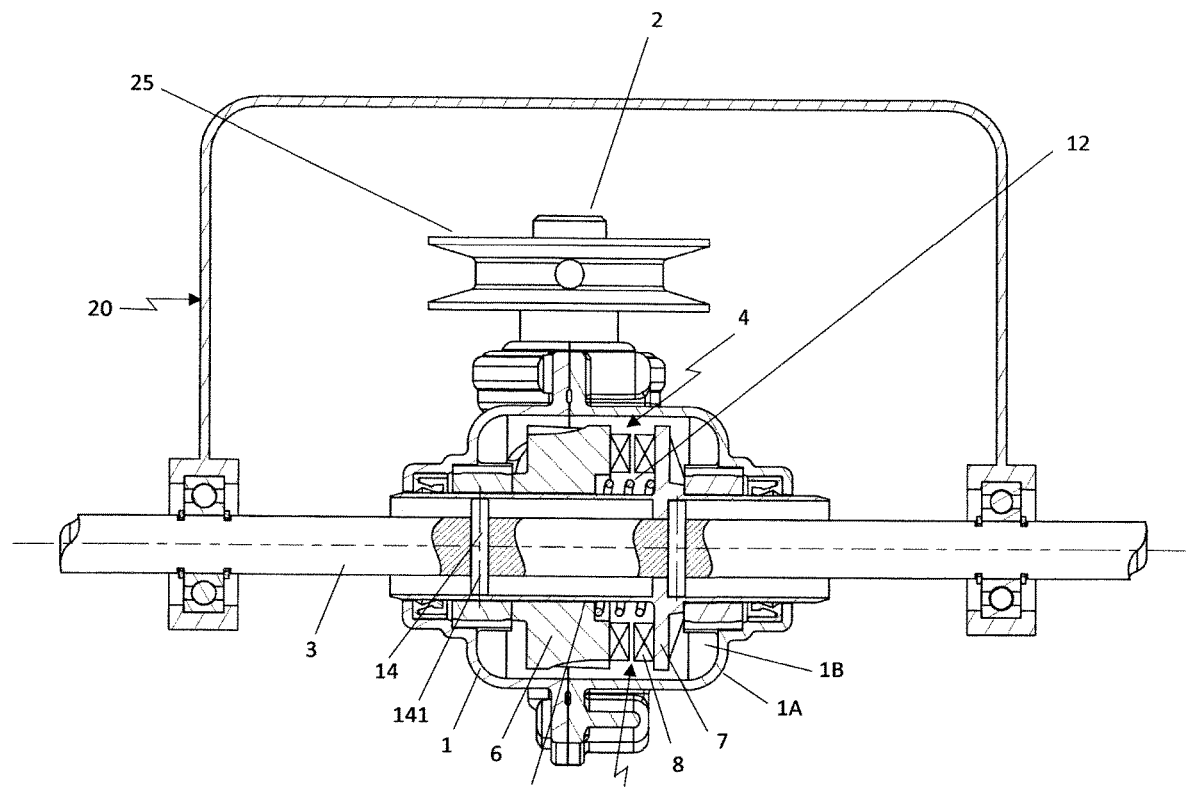
FIG. 5 represents a sectional view of a transmission housing in the state in which the output shaft is mounted on the chassis of a machine, in the disengaged position of the clutch of the transmission housing.
Figure 6:
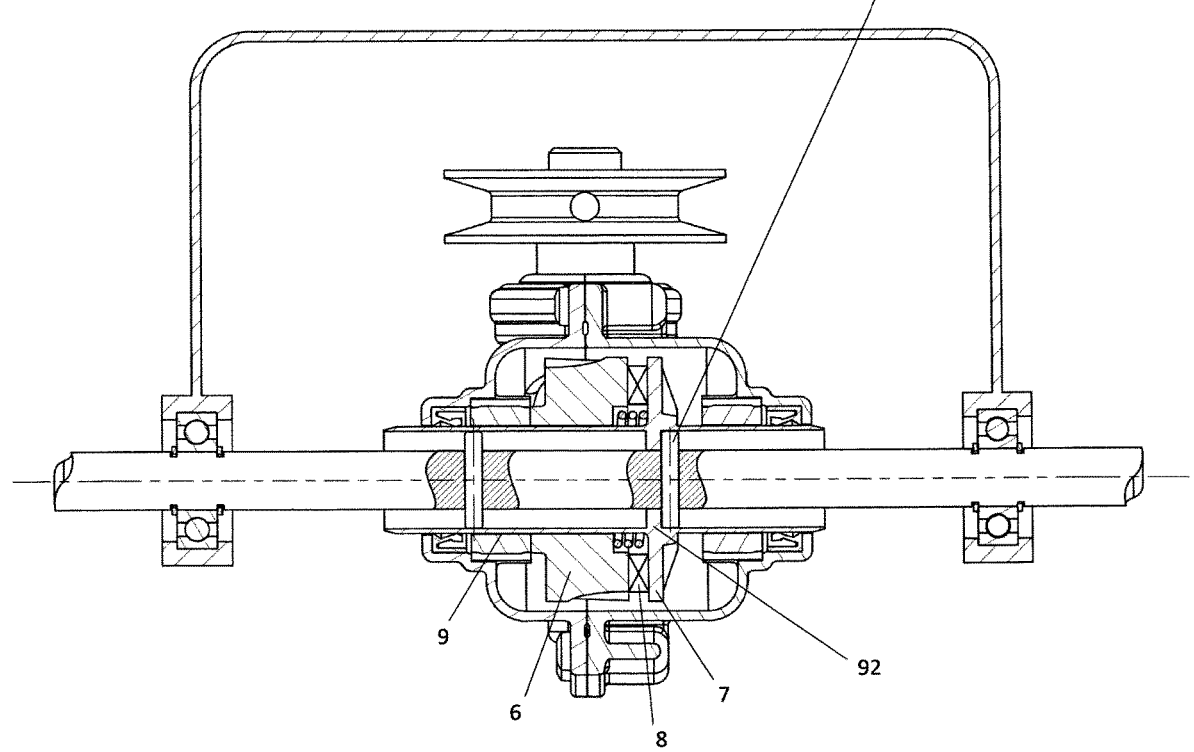
FIG. 6 represents a sectional view of a transmission housing, in the state in which the output shaft is mounted on the chassis of a machine, in the engaged position of the clutch of the transmission housing.
Figure 8:
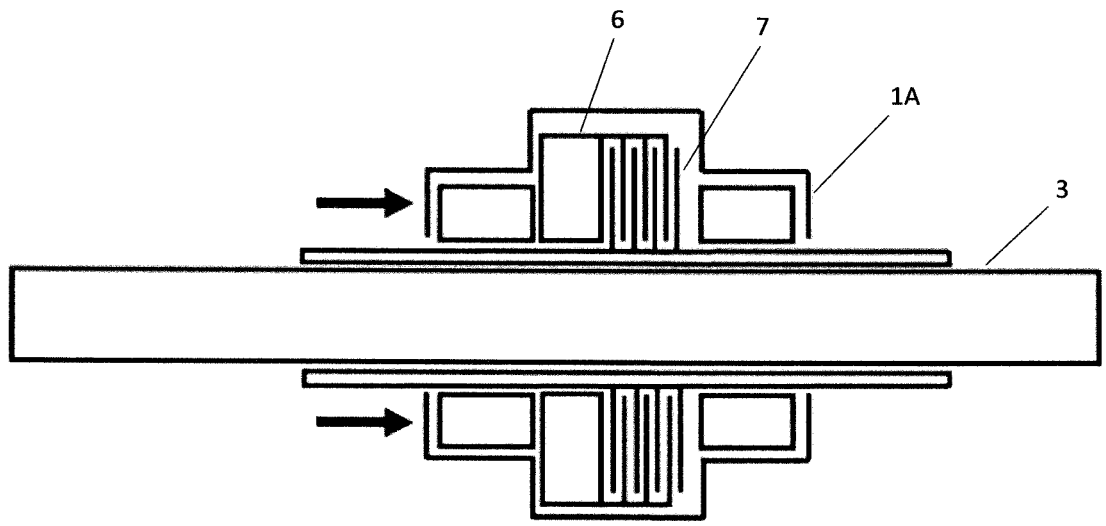
FIGS. 8a and 8b represent, in the form of schematic views, a transmission housing equipped with a multidisk clutch and the passage of said clutch from the disengaged position (FIG. 8a) to the engaged position (FIG. 8b).
Figure 8:
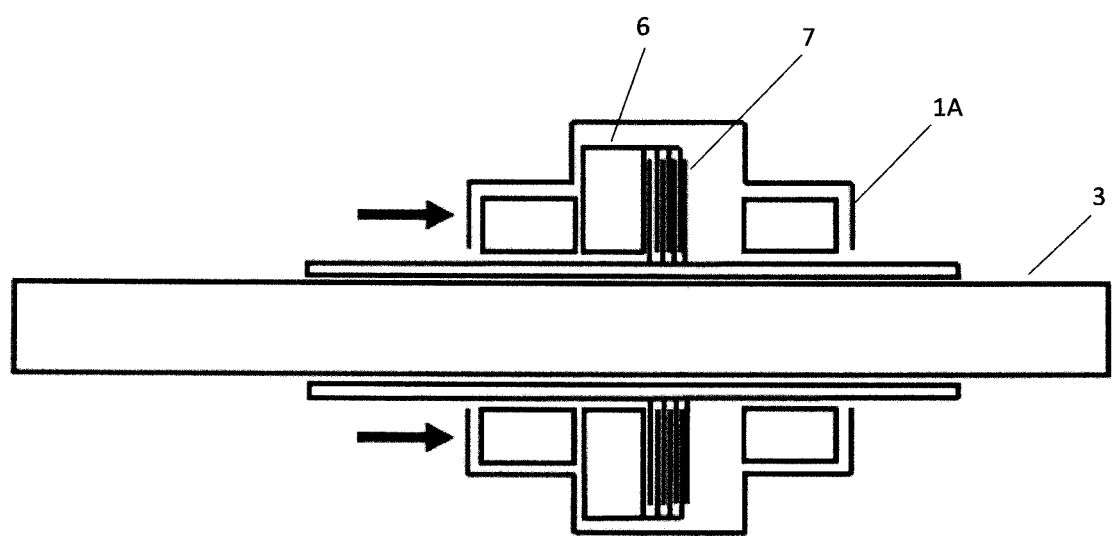

In the example represented in FIGS. 5 and 6, the driven element 7 of the clutch 5 comprises an active clutch part 8 and a sleeve 9 which bears the active clutch part 8, the active clutch part 8 being in bearing contact with the driving element 6 of the clutch 5 in the engaged position of the clutch 5, the sleeve 9 being coaxial to the output shaft 3 and locked in rotation with the output shaft 3, and the driving element 6 being mounted so as to be able to slide along the sleeve 9 in the direction of a movement toward the driven element, under the action of a sliding movement of the housing body 1A along the output shaft 3.

In the example represented in FIGS. 5 to 8b, the sleeve 9 and the active clutch part 8 are made in one piece. The sleeve 9 is internally grooved longitudinally and is mounted so as to be locked in rotation with the output shaft 3 by way of at least one connection member 14 preferably mounted in a removable manner on the output shaft 3, this connection member 14 projecting radially from said output shaft 3. Each radial part 141 of said connection member 14 outside the output shaft 3 is fitted slidingly in an inner longitudinal groove 91 of the sleeve 9. The sleeve 9 is provided with an inner circumferential shoulder 92 which can be positioned in bearing contact against each radial part 141 of said connection member 14 outside the output shaft 3 in the state in which the sleeve 9 is mounted on the output shaft 3. Each radial part 141 of said connection member 14 outside the output shaft 3 forms an axial stop for limiting the movement of the sleeve 9 along said output shaft 3 in the direction of a movement of the active clutch part 8 of the sleeve 9 away from the driving element 6.

In the example represented, in particular in FIGS. 5 and 6, the sleeve 9 is internally grooved longitudinally and is mounted so as to be locked in rotation with the output shaft 3 by way of two pins each passing through the output shaft 3. Each end of each pin is fitted slidingly in an inner longitudinal groove of the sleeve. One of the pins, which constitutes one of the connection members 14 between the output shaft 3 and the sleeve 9, forms a stop for limiting the axial movement of the sleeve 9 along the output shaft 3 in the direction of a movement away from the driving element 6. The output shaft 3 is itself held axially fixed on the chassis of the machine, as illustrated in FIG. 5. In a variant, the sleeve could have been internally grooved longitudinally and mounted so as to be locked in rotation with the output shaft by way of a pair of stirrups secured to the output shaft, the stirrups being fitted slidingly in an inner longitudinal groove of the sleeve.

The sleeve 9 is provided with an inner circumferential shoulder 92 which can be positioned in bearing contact against the or one of the pairs of stirrups, or against the or one of the pins in the state in which the sleeve 9 is mounted on the output shaft 3. This pair of stirrups or this pin forms an axial stop for limiting the movement of the sleeve 9 along said output shaft 3 in the direction of a movement of the driven element away from the driving element.

In the examples of FIGS. 4 to 9*b*, the driving element 6 of the clutch 5 is mounted on the output shaft 3 so as to be free to rotate and to be movable axially along said output shaft 3.

The clutch 5 of FIGS. 5 and 6 is a dog clutch mechanism. The driving element 6 is a toothed wheel mounted so as to be free to rotate and to be movable axially along the output shaft 3. This toothed wheel is provided, on its surface facing the driven element 7, with teeth. This toothed wheel is in meshing engagement with a worm screw which forms the input shaft of the housing 1.

The active part 8 of the driven element 7 is for its part formed by a plate surrounding the sleeve 9. This plate is provided, on its surface facing the toothed wheel, with teeth intended to cooperate with the teeth of the toothed wheel in the engaged position of the clutch 5. In this embodiment, the sliding movement of the housing body 1A therefore causes the toothed wheel to be moved toward the toothed plate. A spring 121 arranged between the facing surfaces of the plate and of the toothed wheel returns the toothed wheel and therefore the housing body 1A into a position in which they are moved away from the toothed plate, corresponding to the disengaged position of the clutch 5.

FIGS. 7*a* and 7*b* illustrate a similar operation of the clutch 5. The clutch 5 is in this case a cone clutch, with the driving element 6 formed by a toothed wheel internally having a conical part, termed female part, and the driven element 7 formed, at its active part 8, by a cone constituting a male part able to be inserted into the female conical part of the toothed wheel in the engaged position of the clutch 5 corresponding to the position in which the driving element 6 is moved toward the driven element 7.

FIGS. 8*a* and 8*b* also illustrate a similar operation of the clutch 5. The clutch 5 is in this case a multidisk clutch, with the driving element formed by a toothed wheel coupled in movement with a plurality of disks able to cooperate by bearing contact with a series of disks forming the active part of the driven element.

It should be noted that in these embodiments the sleeve 9 projects partially from the housing body in the state in which the sleeve is mounted on the output shaft.

Figure 9A:
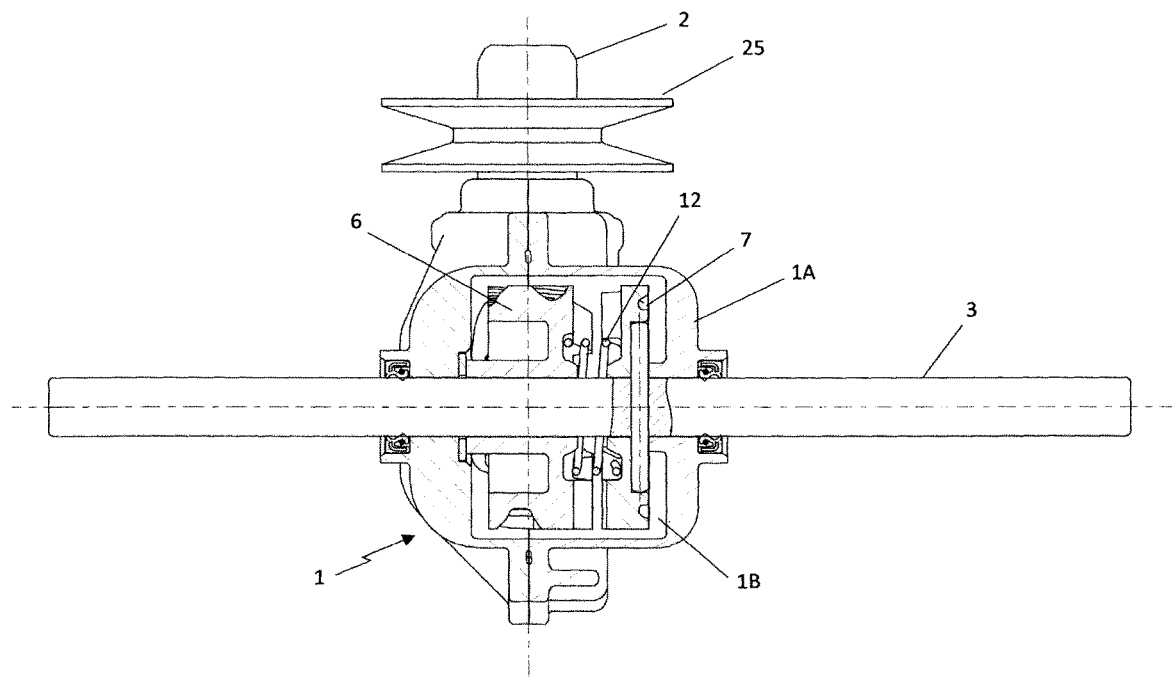
FIGS. 9a and 9b represent, in the form of sectional views, a transmission housing equipped with a clutch in the disengaged position (FIG. 9a) and in the engaged position (FIG. 9b).
Figure 9B:
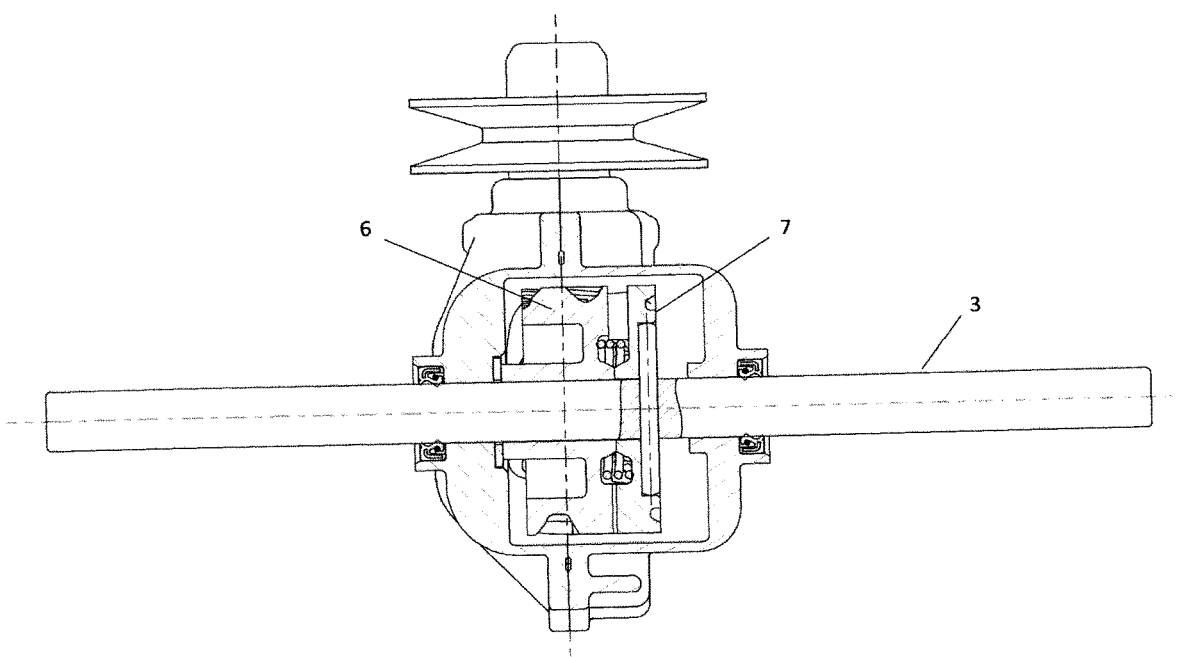

Finally, FIGS. 9*a* and 9*b* illustrate a simplified version of a dog clutch in which the driving element 6 is a toothed wheel with teeth in accordance with FIGS. 5 and 6 that is arranged around the output shaft without interposition of the sleeve of the driven element as in FIGS. 5 and 6. In this case, the driven element 7 is a simple toothed plate with a central cutout such that it can be slipped over the output shaft 3. This driven element 7 is locked in rotation with the output shaft 3 and limited in axial movement along the output shaft, for example by pinning.

Independently of the embodiment of the clutch, the operation is always the same for the passage from the disengaged position to the engaged position of the clutch 5. The operator actuates the operating member 13, which causes a sliding movement of the housing body 1A along the output shaft in the direction of a movement of the driving element 6 toward the driven element 7. Elastically deformable means 12 return the driving element 6 and the housing body 1A into a position in which they are moved away from the driven element 7, this moved-away position corresponding to the disengaged position of the clutch 5.

The invention claimed is:

1. A transmission housing comprising:
a housing body delimiting an enclosure,
an input shaft,
an output shaft,
a mechanism for transmitting the movement of the input shaft to the output shaft, this movement transmission mechanism having at least one clutch, and
a device for controlling the clutch, the input shaft, the output shaft and the mechanism for transmitting the movement of the input shaft to the output shaft being housed at least partially within the enclosure of the housing body, the clutch having a driving element and a driven element which is mounted so as to be locked in rotation with the output shaft and limited in axial movement in at least one direction along the output shaft, the device for controlling the clutch having a member for controlling the movement of the driving element and the driven element toward one another to allow the clutch to pass from the disengaged position to the engaged position, wherein the member for controlling the movement of the driving element and the driven element toward one another to allow the clutch to pass from the disengaged position to the engaged position is formed by the housing body mounted so as to be able to slide along the output shaft.

2. The housing as claimed in claim 1, wherein the housing body is configured, during its sliding movement along the output shaft in a direction corresponding to the passage of the clutch from the disengaged position to the engaged position, to move the driving element in the direction of a movement toward the driven element.

3. The housing as claimed in claim 1, wherein the clutch comprises means for returning the driving element and the driven element in the direction of a movement away from one another, and in that the housing body is configured, during its sliding movement along the output shaft in a direction corresponding to the passage of the clutch from the disengaged position to the engaged position, to move the driving element in the direction of a movement toward the driven element, against the return means.

4. The housing as claimed in claim 1, wherein the device for controlling the clutch has a member for operating the member for controlling the movement of the driving element and the driven element toward one another, which operating member can be coupled to the housing body, and in that the housing body forming the member for controlling the movement of the driving element and the driven element toward one another is able to slide along the output shaft in a direction corresponding to the passage of the clutch from the disengaged position to the engaged position under the action of a pull or of a push exerted on said operating member, in the state in which the operating member is coupled to the housing body.

5. The housing as claimed in claim 1, wherein the driven element of the clutch has an active clutch part and a sleeve which bears the active clutch part, the active clutch part being in bearing contact with the driving element of the clutch in the engaged position of the clutch, the sleeve being coaxial to the output shaft and locked in rotation with the output shaft, and the driving element being mounted so as to be able to slide along the sleeve.

6. The housing as claimed in claim 5, wherein the sleeve and the active clutch part are made in one piece.

7. The housing as claimed in claim 5, wherein the sleeve is internally grooved longitudinally and is mounted so as to be locked in rotation with the output shaft by way of at least one connection member preferably mounted in a removable manner on the output shaft, this connection member projecting radially from said output shaft, each radial part of said connection member outside the output shaft being fitted slidingly in an inner longitudinal groove of the sleeve.

8. The housing as claimed in claim 7, wherein the sleeve is provided with an inner circumferential shoulder which can be positioned in bearing contact against each radial part of said connection member outside the output shaft in the state in which the sleeve is mounted on the output shaft, each radial part of said connection member outside the output shaft forming an axial stop for limiting the movement of the sleeve along said output shaft in the direction of a movement of the active clutch part of the sleeve away from the driving element.

9. The housing as claimed in claim 5, wherein the sleeve projects partially from the housing body, in the state in which the sleeve is mounted on the output shaft.

10. The housing as claimed in claim 1, wherein the driving element of the clutch is a rotary element able to be rotated by the input shaft, this driving element of the clutch being mounted to rotate freely with respect to the output shaft in the disengaged position of the clutch.

11. The housing as claimed in claim 1, wherein the clutch is a nonprogressive clutch, selected from the group consisting of a dog clutch, or a progressive clutch, selected from the group consisting of a cone clutch or multidisk clutch.

12. A wheeled machine comprising:
a motor,
a transmission housing having a housing body delimiting an enclosure and, housed at least partially within the housing enclosure, an input shaft, an output shaft for driving the wheels of the machine, and
a mechanism for transmitting the movement of the input shaft to the output shaft,
the movement transmission mechanism has at least one clutch, the clutch has a movable driving element and a driven element which is mounted so as to be locked in rotation with the output shaft and limited in axial movement in at least one direction along the output shaft,
said housing additionally having a device for controlling the clutch, the device for controlling the clutch having a member for controlling the movement of the driving element and the driven element toward one another to allow the clutch to pass from the disengaged position to the engaged position, said wheeled machine additionally having endless transmission means between the motor and the input shaft of the transmission housing,
wherein the housing is in accordance with claim 1.

13. The machine as claimed in claim 12, wherein the endless transmission means has an endless transmission with a belt between a drive pulley mounted on the motor and a driven pulley borne by the input shaft of the transmission housing, and in that the housing body is mounted to oscillate about the output shaft in the direction of a tension, or respectively of a relaxation, of the belt of the transmission.

* * * * *